(12) United States Patent
Yuan et al.

(10) Patent No.: US 9,876,588 B2
(45) Date of Patent: Jan. 23, 2018

(54) SYSTEMS AND METHODS FOR PERFORMING TESTER-LESS RADIO-FREQUENCY TESTING ON WIRELESS COMMUNICATIONS CIRCUITRY

(71) Applicant: Apple Inc., Cupertino, CA (US)

(72) Inventors: Chao Yuan, Sunnyvale, CA (US); Wassim El-Hassan, Cupertino, CA (US); Vishwanath Venkataraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 14/477,703

(22) Filed: Sep. 4, 2014

(65) Prior Publication Data

US 2016/0072594 A1     Mar. 10, 2016

(51) Int. Cl.
| | |
|---|---|
| *H04B 17/00* | (2015.01) |
| *H04B 17/16* | (2015.01) |
| *H04B 17/19* | (2015.01) |
| *H04B 17/21* | (2015.01) |

(52) U.S. Cl.
CPC ......... *H04B 17/0085* (2013.01); *H04B 17/16* (2015.01); *H04B 17/19* (2015.01); *H04B 17/21* (2015.01)

(58) Field of Classification Search
CPC .... H04B 17/16; H04B 17/0085; H04B 17/21; H04B 17/19
See application file for complete search history.

(56) References Cited

U.S. PATENT DOCUMENTS

| | | | |
|---|---|---|---|
| 8,374,815 B2 | 2/2013 | Gregg et al. | |
| 2003/0176174 A1* | 9/2003 | Seppinen | H04B 17/21 455/226.1 |
| 2012/0122406 A1* | 5/2012 | Gregg | H04L 12/2697 455/67.11 |
| 2013/0093447 A1 | 4/2013 | Nickel et al. | |
| 2014/0098846 A1 | 4/2014 | Emmanuel et al. | |
| 2014/0162628 A1 | 6/2014 | Bevelacqua et al. | |
| 2014/0269871 A1* | 9/2014 | Huynh | H04B 1/38 375/224 |

(Continued)

*Primary Examiner* — Ping Hsieh
(74) *Attorney, Agent, or Firm* — Treyz Law Group, P.C.; Michael H. Lyons; Joseph F. Guihan

(57) ABSTRACT

Radio-frequency performance of wireless communications circuitry on an electronic device under test (DUT) may be tested without external test equipment such as signal analyzers or signal generators. A first DUT may transmit test signals to a second DUT. External attenuator circuitry interposed between the DUTs may attenuate the test signals to desired power levels. The second DUT may characterize and/or calibrate receiver performance by generating wireless performance metric data based on the attenuated test signals. A single DUT may transmit test signals to itself via corresponding transmit and receive ports coupled together through the attenuator. The DUT may generate performance metric data based on the test signals. The DUT may include feedback receiver circuitry coupled to an output of a transmitter via a feedback path and may characterize and/or calibrate transmit performance using test signals transmitted by the transmitter and received by the feedback receiver.

17 Claims, 9 Drawing Sheets

(56) References Cited

U.S. PATENT DOCUMENTS

2015/0017928 A1* 1/2015 Griesing ............ H04B 17/0085
  455/67.14
2015/0163748 A1* 6/2015 Hrabak ............. H04W 52/0245
  455/41.2

* cited by examiner

SYSTEMS AND METHODS FOR PERFORMING TESTER-LESS RADIO-FREQUENCY TESTING ON WIRELESS COMMUNICATIONS CIRCUITRY

BACKGROUND

This relates generally to wireless communications circuitry, and more particularly, to electronic devices having wireless communications circuitry.

Wireless electronic devices such as portable computers and cellular telephones are often provided with wireless communications circuitry. The wireless communications circuitry is operable to transmit and receive wireless radio-frequency signals. The wireless communications circuitry is tested in a test system to ensure adequate radio-frequency performance. A given wireless electronic device having wireless communications circuitry is typically tested at a test station having external radio-frequency test equipment that includes a radio-frequency test signal generator and signal analyzer equipment that is formed separately from the wireless electronic devices under test.

During radio-frequency testing, the external test equipment is connected to a wireless electronic device under test. The external radio-frequency test signal generator generates radio-frequency test signals having selected properties and provides the test signals to the wireless electronic device under test. The wireless electronic device under test performs radio-frequency tests using the test signals received from the test signal generator to characterize the downlink (receive) performance of the wireless communications circuitry. The wireless electronic device under test generates radio-frequency test signals and transmits the test signals to the external signal analyzer equipment. The external signal analyzer equipment receives the radio-frequency test signals from the electronic device under test and analyzes the received signals to characterize the uplink (transmit) performance of the wireless communications circuitry. Performing radio-frequency testing on wireless communications circuitry using external test equipment such as test signal generator equipment and signal analyzer equipment can be excessively costly and time consuming, as external radio-frequency test equipment can be expensive and can require excessive time to set up for testing multiple wireless electronic devices under test.

It would therefore be desirable to be able to provide improved test systems for testing wireless communications circuitry without using external radio-frequency test equipment.

SUMMARY

An electronic device may be provided with wireless communications circuitry. The radio-frequency performance of the wireless communications circuitry may be tested using a test system or may be tested during normal device operation without using external radio-frequency test equipment such as signal analyzer equipment or signal generator equipment. Wireless communications circuitry (or an electronic device on which the circuitry is formed) on which radio-frequency testing is being performed may sometimes be referred to herein as an electronic device under test.

A first electronic device under test may be used to perform radio-frequency testing on a second electronic device under test. For example, the first electronic device under test may generate and transmit radio-frequency test signals via a radio-frequency transmit port on the first electronic device under test. The transmit port may be coupled to an input of attenuator circuitry via a radio-frequency test cable. An output of the attenuator circuitry may be coupled to a radio-frequency receive port on the second electronic device under test via an additional radio-frequency cable. The attenuator circuitry may be separate from (e.g., external to) the devices under test. The attenuator circuitry may attenuate the radio-frequency test signals transmitted by the first electronic device under test by one or more attenuation levels (e.g., a sequence of attenuation levels). The second electronic device under test may receive the attenuated radio-frequency test signals from the attenuator circuitry via the radio-frequency receive port on the second electronic device under test. The second electronic device under test (e.g., processing circuitry on the second electronic device under test) may generate radio-frequency performance metric data based on the received radio-frequency test signals and may characterize and/or calibrate the radio-frequency performance of receiver circuitry on the second electronic device under test based on the performance metric data. For example, the second electronic device under test may compare the generated performance metric data to desired (target) performance metric values (e.g., a range of acceptable values) and, if the generated performance metric data does not fall within the range of acceptable values, the processing circuitry may generate and store calibration data on storage circuitry on the second electronic device under test for use during subsequent device operations (e.g., during normal device operations by an end user).

If desired, the second electronic device under test may perform radio-frequency testing on the first device under test. For example, the second electronic device under test may generate and transmit additional radio-frequency test signals to the attenuator circuitry via an additional radio-frequency transmit port on the second electronic device under test and the attenuator circuitry may pass the attenuated additional radio-frequency test signals to an additional radio-frequency receive port on the first electronic device under test. The first electronic device under test may generate additional radio-frequency performance metric data based on the attenuated additional radio-frequency test signals and may characterize and/or calibrate the radio-frequency performance of receiver circuitry on the first electronic device under test based on the additional performance metric data. In another suitable arrangement, a third electronic device under test may transmit additional radio-frequency test signals via an additional radio-frequency transmit port on the third electronic device under test to the attenuator circuitry and the attenuator circuitry may convey attenuated versions of the additional radio-frequency test signals to the receive port on the first electronic device under test to characterize and/or calibrate the radio-frequency receive performance of the first electronic device under test, In this way, a group of devices under test may generate test signals for testing and calibrating each other without using external signal generator or analyzer equipment.

The second electronic device under test may include low noise amplifier circuitry having multiple gain stages coupled between a radio-frequency receiver circuit on the second electronic device under test and the radio-frequency receive port. The second electronic device under test (e.g., processing circuitry on the second electronic device under test) may generate a first set of the radio-frequency performance metric data while only a selected one of the gain stages is activated and may generate a second set of the radio-frequency performance metric data while all of the gain stages is activated, if desired. The first and second sets of performance metric data may be used to characterize and/or calibrate the radio-frequency performance of the low noise amplifier circuitry and/or the receiver circuitry.

A single electronic device under test may generate radio-frequency test signals that are transmitted to itself for testing the radio-frequency performance of the electronic device under test without external tester equipment. The attenuator circuitry may be coupled between a radio-frequency transmit port on the electronic device under test and a radio-frequency receive port on the electronic device under test. Transmitter circuitry on the device under test may transmit radio-frequency test signals that are conveyed to the attenuator circuitry via the radio-frequency transmit port. The attenuator circuitry may attenuate the radio-frequency test signals and may convey the attenuated test signals to the receive port of the device under test. Processing circuitry (e.g., baseband processing circuitry) on the electronic device under test may generate radio-frequency performance metric data based on the attenuated radio-frequency test signals to characterize and/or calibrate the radio-frequency receive performance of the device under test. In this way, the electronic device may characterize/calibrate radio-frequency receive performance on itself without using external radio-frequency signal generator or signal analyzer circuitry.

An electronic device under test may include baseband processing circuitry, radio-frequency transmitter circuitry, and feedback receiver circuitry coupled to an output of the radio-frequency transmitter circuitry via a conductive feedback path. The radio-frequency transmitter circuitry may transmit radio-frequency test signals and the feedback receiver circuitry may receive the transmitted radio-frequency test signals from the transmitter circuitry via the conductive feedback path. The feedback receiver circuitry may generate and provide test data corresponding to the transmitted radio-frequency test signals to the baseband processing circuitry. For example, the feedback receiver circuitry may convert the transmitted radio-frequency test signals to in-phase and quadrature-phase (I/Q) test data and may provide the I/Q test data to the baseband processing circuitry. The baseband processing circuitry may generate radio-frequency performance metric data based on the test data received from the feedback receiver circuitry. Processing circuitry (e.g., processing circuitry implementing test software) may process the performance metric data to characterize and/or calibrate the radio-frequency transmit performance of the electronic device (e.g., the radio-frequency performance of the transmitter circuitry, power amplifier circuitry coupled to the transmitter circuitry, filtering circuitry coupled to the transmitter circuitry, etc.).

If desired, the processing circuitry may load a sequence of test commands onto the baseband processing circuitry that instruct the radio-frequency transmitter circuitry to generate the radio-frequency test signals (e.g., based on information in the sequence of test commands). The processing circuitry may provide control signals to the baseband processing circuitry prior to transmitting the radio-frequency test signals using the radio-frequency transmitter by providing control signals to the baseband processing circuitry that configure the baseband processing circuitry to measure the performance metric data in response to receiving the test data from the feedback receiver circuitry. The feedback receiver circuitry may be formed separately from radio-frequency receiver circuitry that is configured to receive radio-frequency downlink signals from antenna circuitry on the electronic device. In this way, the electronic device may characterize/calibrate radio-frequency transmit performance on itself without using external radio-frequency signal generator or signal analyzer circuitry.

Further features of the invention, its nature and various advantages will be more apparent from the accompanying drawings and the following detailed description of the preferred embodiments.

DETAILED DESCRIPTION

Figure 1:
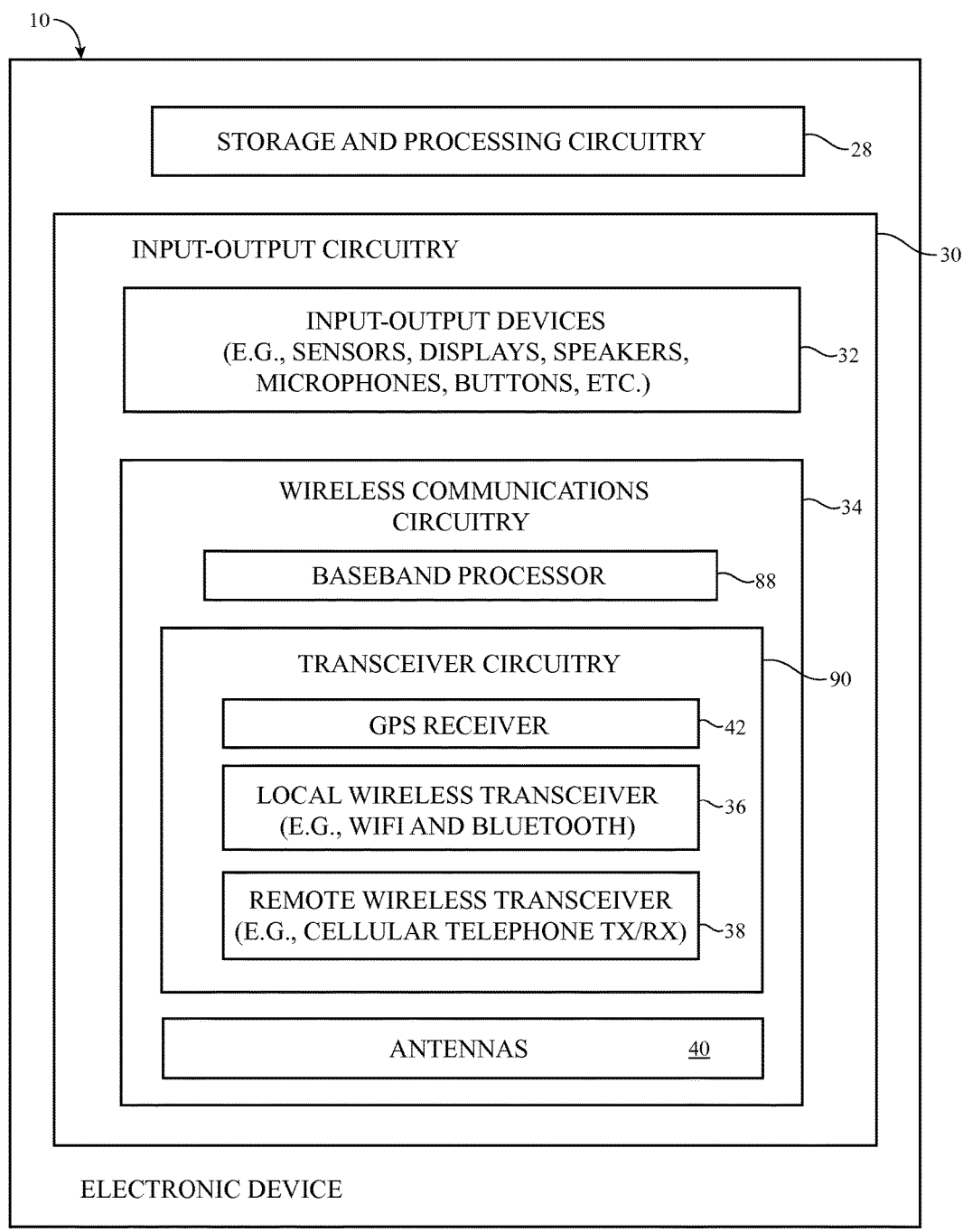
FIG. 1 is a schematic diagram of an illustrative electronic device with wireless communications circuitry for communicating with external communications devices in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc.

As shown in FIG. 1, device 10 may include storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as radio-frequency testing and calibration software, internet, browsing applications, voice-over-internet-protocol (VOIP) telephone call applications, email applications, media playback applications, operating system functions, functions related to communications band selection during radio-frequency transmission and reception operations, etc. To support interactions with external equipment (e.g., a radio-frequency base station, radio-frequency test equipment, etc.), storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, the "4G" Long Term Evolution (LTE) protocol, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless, communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, filtering circuitry, passive RF components, one or more antennas, transmission lines, and other circuitry for handling RF wireless signals. Wireless signals can also be sent using light (e.g., using infrared communications).

Wireless-communications circuitry 34 may include radio-frequency transceiver circuitry 90 for handling various radio-frequency communications bands. For example, circuitry 90 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data traffic.

Transceiver circuitry 90 may include global positioning system (GPS) receiver equipment such as GPS receiver circuitry 42 for receiving GPS signals at 1575 MHz or for handling other satellite positioning data such as Global Navigation Satellite System (GLONASS) data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

As shown in FIG. 1, wireless communications circuitry 34 may also include baseband processor 88. Baseband processor may include memory and processing circuits and may also be considered to form part of storage and processing circuitry 28 of device 10. Baseband processor 88 may be used to provide data to storage and processing circuitry 28.

Data that is conveyed to circuitry 28 from baseband processor 88 may include raw data (e.g., downlink data received from external communications equipment) and processed data associated with wireless (antenna) performance metrics (sometimes referred to herein as wireless performance metric data or performance metric data).

The radio-frequency performance of wireless communications circuitry 34 in device 10 may be characterized by one or more wireless (radio-frequency) performance metrics. Device 10 (e.g., baseband processor 88 or test software running on device 10) may generate data associated with wireless performance metrics in response to received (downlink) signals (sometimes referred to herein as downlink performance metric data, receiver performance metric data, or receive performance metric data associated with the receive performance of device 10). For example, device 10 may generate receive performance metric data associated with performance metrics such as received power, receiver sensitivity, frame error rate, bit error rate, channel quality measurements based on received signal strength indicator (RSSI) information, adjacent channel leakage ratio (ACLR) information (e.g., ACLR information in one or more downlink frequency channels), channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information about how many re-transmissions are being requested over a cellular link between the electronic device and a cellular tower, information on whether a loss of signaling message has been received, information on whether paging signals have been successfully received, any desired combination of these performance metrics, and other information that is reflective of the performance of wireless circuitry 34 in device 10. Receive performance metric data may, for example, include receive performance metric values measured for a given performance metric (e.g., measured error rate values, measured power level values, measured SNR values, measured RSSI values, etc.).

Storage and processing circuitry 28 may obtain radio-frequency performance metric data generated in response to radio-frequency uplink (transmit) test signals that are transmitted by device 10 (sometimes referred to herein as uplink performance metric data or transmit performance metric data associated with the transmit performance of device 10). For example, storage and processing circuitry 28 may receive data associated with Error Vector Magnitude (EVM), output power, spectral parameters, Adjacent Channel Leakage Ratio (ACLR), or any other desired performance metric associated with uplink signal transmission by wireless communications circuitry 34. Transmit performance metric data may be used to characterize the radio-frequency performance of wireless communications circuitry 34 while transmitting signals. Transmit and receive performance metric data associated with wireless communications circuitry 34 may sometimes be referred to collectively as performance metric data. In general, performance metric data may include data associated with any desired performance metric for the transmission or reception of radio-frequency signals by wireless communications circuitry 34.

Device 10 may perform radio-frequency test operations to characterize the radio-frequency performance (e.g., the transmit and/or receive performance) of wireless communications circuitry 34 (e.g., using one or more transmit and/or receive performance metrics). A device 10 having wireless communications circuitry 34 on which radio-frequency tests are being performed may sometimes be referred to herein as device under test (DUT) 10'. DUT 10' may, for example, be a fully assembled electronic device that is enclosed within a form factor or device housing or a partially assembled electronic device (e.g., DUT 10' may include some or all of wireless circuitry 34 prior to completion of manufacturing of device 10).

Figure 2:
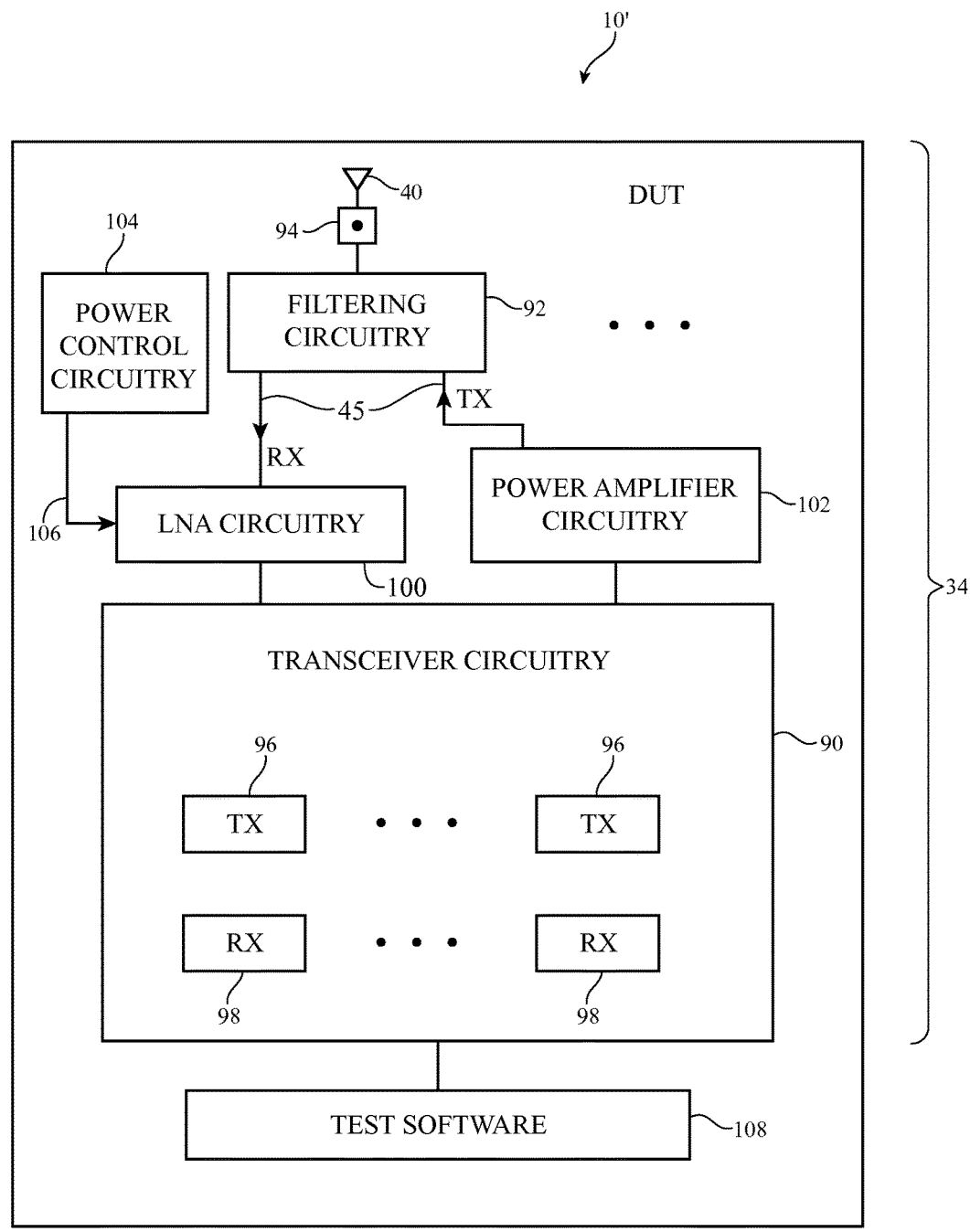
FIG. 2 is a diagram of an illustrative electronic device under test having wireless communications circuitry that shows how radio-frequency transceiver circuitry may be coupled to antennas within the electronic device under test in accordance with an embodiment of the present invention.

An illustrative diagram of a DUT 10' having wireless communications circuitry 34 for testing is shown in FIG. 2. As shown in FIG. 2, wireless communications circuitry 34 on DUT 10' may include transceiver circuitry 90 coupled to one or more antennas 40 by conductive paths such as paths 45. Paths 45 may include transmission line structures such as coaxial cables, microstrip transmission lines, stripline transmission lines, etc. Filtering circuitry such as filter circuitry 92 may be interposed on paths 45 between antenna 40 and transceiver circuitry 90. Filtering circuitry 92 may be used to implement frequency-based multiplexing circuits such as diplexers, duplexers, triplexers, or any other desired multiplexing circuits. Filtering circuitry 92 may, for example, filter radio-frequency signals provided to and received from antenna 40 by the corresponding frequency of the signals. In the example of FIG. 2, filtering circuitry 92 may isolate radio-frequency transmit (uplink) signals TX and radio-frequency receive (downlink) signals RX conveyed between antenna 40 and transceiver 90.

DUT 10' may include radio-frequency connector structure 94 (e.g., a radio-frequency switch connector or other radio-frequency connector) interposed on path 45 between antenna 40 and transceiver circuitry 90. Test cables (not shown for the sake of clarity) may be connected to connector structure 94 during testing. When mated with a test cable, antenna structures 40 may be decoupled from filtering circuitry 92. At the same time, radio-frequency connector 94 may electrically connect filtering circuitry 92 to the test cable (e.g., so that radio-frequency transmit signals TX and receive signals RX are conveyed over the test cable instead of over antenna 40). Connector 94 may form a radio-frequency port of transceiver circuitry 90 through which radio-frequency signals are conveyed to and from transceiver circuitry 90. Test cabling may be connected to port 94 during radio-frequency testing. Port 94 may sometimes be referred to herein as a transmit port when uplink signals are transmitted to port 94 by transceiver circuitry 90. Port 94 may sometimes be referred to herein as a receive port when radio-frequency signals are received at port 94 over a corresponding test cable.

If desired, other radio-frequency circuitry such as radio-frequency front end circuitry, impedance matching circuitry, analog-to-digital converter circuitry, digital-to-analog converter circuitry, and/or switching circuitry may be interposed on path 45 between transceiver circuitry 90 and port 94 (as examples). Transceiver circuitry 90 may contain transmitters such as radio-frequency transmitters 96 and receivers such as radio-frequency receivers 98. Transmitters 96 and receivers 98 may be implemented using one or more integrated circuits (e.g., cellular telephone communications circuits, wireless local area network communications circuits, circuits for Bluetooth® communications, circuits for receiving satellite navigation system signals, power amplifier circuits for Increasing transmitted signal power, low noise amplifier circuits for increasing signal power in received signals, other suitable wireless communications circuits, and combinations of these circuits). Radio-frequency transmitters 96 may provide radio-frequency transmit signals TX to port 94 over paths 45 and radio-frequency receivers 98 may receive radio-frequency receive signals RX from port 94 over paths 45.

If desired, low-noise amplifier (LNA) circuitry such as LNA circuitry 100 may be interposed on paths 45 between filtering circuitry 92 and receivers 98 in transceiver circuitry 90. Signals that are received via port 94 (e.g., via antenna 40 or associated test cabling) may be amplified by LNA circuitry 100 and LNA circuitry 100 may provide the amplified signals to receiver circuits 98. If desired, LNA circuitry 100 may include one or more individual low noise amplifiers (sometimes referred to herein as individual LNA gain stages). Power supply circuitry such as power control circuitry 104 may control LNA circuitry 100 using control signals provided to LNA circuitry 100 over path 106, Power control circuitry 104 may, for example, provide control signals that adjust the gain provided by each Individual amplifier in LNA circuitry 100 (e.g., control signals that adjust a bias voltage supplied to each amplifier in LNA circuitry 100). If desired, power control circuitry 104 may provide control signals to LNA circuitry 100 to selectively activate desired gain stages within LNA circuitry 100 (e.g., so that only a selected one of the gain stages in LNA circuitry 100 is active at a given time while the remaining gain stages are disabled or inactive, etc.). In this way, power control circuitry 104 may actively adjust the gain provided by LNA circuitry 100 to signals RX received from port 94.

Signals that are to be transmitted over antennas 40 by transmitter circuits 96 may be amplified using power amplifier circuitry 102. If desired, power amplifier circuitry 102 (sometimes referred to as a power amplifier circuit or power amplifier) may contain one or more individual power amplifiers (e.g., gain stages) used to handle a different cellular telephone standard or frequency band. During data transmission, power amplifier circuitry 102 may boost the output power of transmitted signals to a sufficiently high level to ensure adequate signal transmission. If desired, power supply circuitry such as power control circuitry 104 may provide control signals to power amplifier circuitry 102 to adjust the gain provided by amplifier circuitry 102 to signals transmitted by transceiver circuitry 90 (e.g., to activate one or more gain stages in circuitry 102, to adjust bias voltages, etc.).

DUT 10' may have any desired number of antennas 40 coupled to any desired number of transmitters 96 and/or receivers 98. For example, DUT 10' may include one or more antennas 40 coupled to transmitters and receivers in transceiver circuitry 90 via corresponding filtering circuitry, LNA circuitry, and power amplifier circuitry, DUT 10' may include one or more antennas 40 coupled to only a transmitter in transceiver circuitry 90 via corresponding power amplifier circuitry. DUT 10' may include one or more antennas 40 coupled to only a receiver in transceiver circuitry 90 via corresponding LNA circuitry. DUT 10' may include a combination of these arrangements, etc. Each antenna may have a corresponding radio-frequency port and radio-frequency connector 94 that may be tapped into using radio-frequency cabling during testing of DUT 10'.

Digital data signals that are to be transmitted by wireless communications circuitry 34 may be provided to transceiver circuitry 90 by baseband processor 88 (FIG. 1). During radio-frequency testing operations, radio-frequency test software such as test software 108 may provide test data (e.g., test signals) to be transmitted to transceiver circuitry 90 (e.g., via baseband processor 88 or directly to transceiver 90). Transceiver circuitry 90 may receive radio-frequency test signals (e.g., via port 94) and may provide the received test signals and/or corresponding test data to test software 108 for processing (e.g., via baseband 88 or directly to software 108). Test software 108 may be implemented on baseband processor 88, on storage and processing circuitry 28, on dedicated processing circuitry, or on any other desired processing circuitry on DUT 10'. Test software 108 may process the received radio-frequency test data and/or the transmitted radio-frequency test data to characterize the radio-frequency performance of DUT 10'. Test software 108 may issue control signals to wireless communications circuitry 34 to control the radio-frequency transmission and/or reception using wireless communications circuitry 34 during testing. If desired, test software 108 may be omitted and wireless communications circuitry 34 may be controlled by external computing equipment such as a test host during testing.

In some radio-frequency test systems, a given device under test such as DUT 10' may be tested using external radio-frequency test equipment such as radio-frequency signal generator equipment and radio-frequency signal analyzer equipment (e.g., a vector network analyzer). The external test equipment may be coupled to DUT 10' via port 94 and corresponding radio-frequency cabling during testing. The external radio-frequency test signal generator may generate radio-frequency test signals having selected properties (e.g., having selected power levels, frequencies, etc.) and may provide the test signals to the DUT 10' via the corresponding radio-frequency test cable and post 94. DUT 10' may perform radio-frequency tests using the test signals received from the test signal generator to characterize the receive performance of the wireless communications circuitry. For example, DUT 10' may calibrate and test the gain of LNA circuitry 100 using the received test signals (e.g., because the received test signals are generated by the signal generator at a known predetermined power level that can be compared to the power level of the signals received at receivers 98).

If desired, DUT 10' may generate radio-frequency test signals and may transmit the test signals to the external signal analyzer equipment via port 94 and the associated radio-frequency cabling. The external signal analyzer equipment may receive the radio-frequency test signals from DUT 10' and may analyze the received signals to characterize the transmit performance of the wireless communications circuitry. However, performing radio-frequency testing on DUT 10' using external test equipment in this manner can be excessively costly and time consuming, as the external test equipment is typically expensive and can require excessive time to set up and maintain. It would therefore be desirable to be able to provide improved test systems for testing wireless communications circuitry without using external radio-frequency test equipment.

Figure 3:
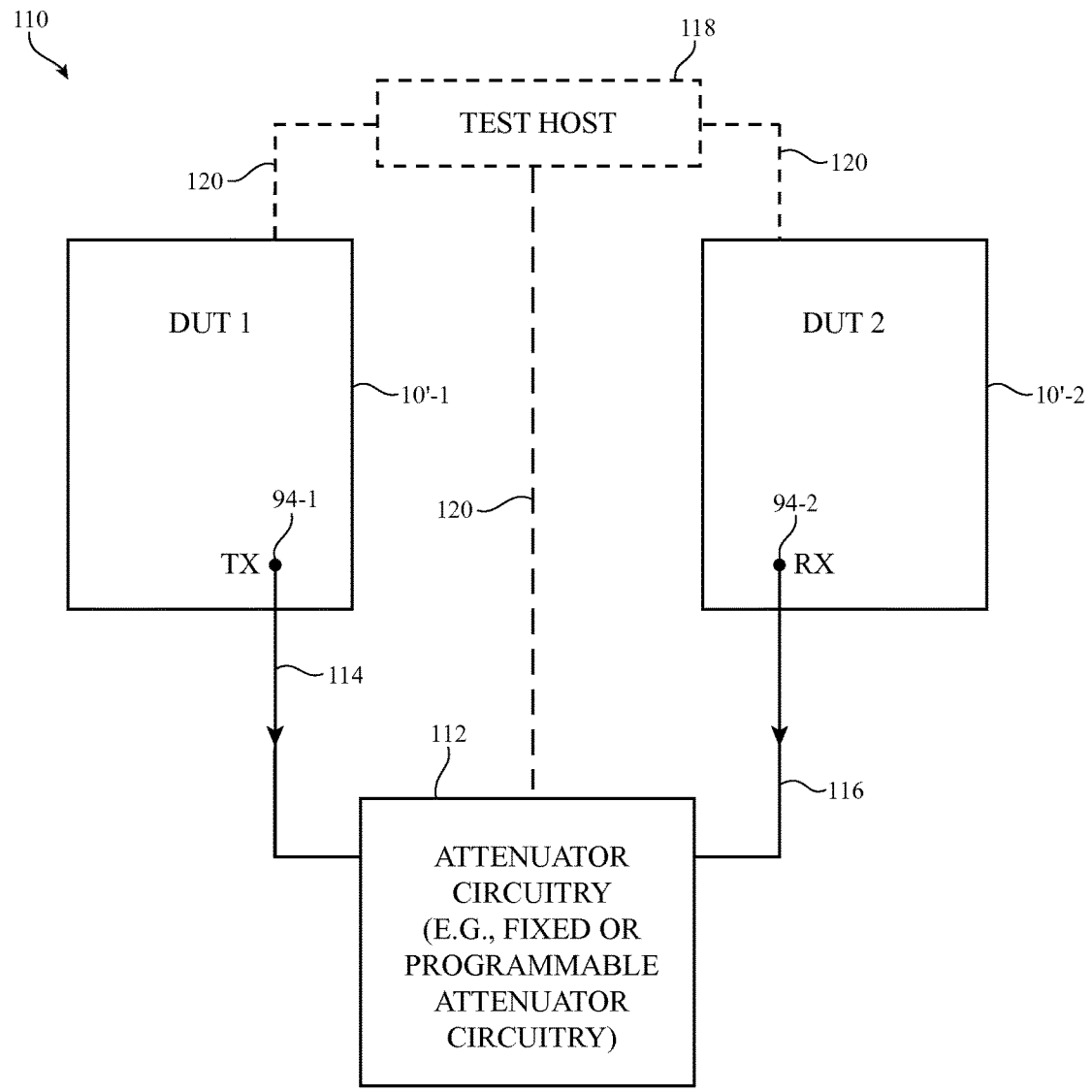
FIG. 3 is a diagram of an illustrative test system for testing wireless communications circuitry in which a first electronic device under test provides radio-frequency test signals to a second electronic device under test to test and/or calibrate the receive performance of the second electronic device under test without using external radio-frequency tester equipment in accordance with an embodiment of the present invention.

FIG. 3 is an illustrative diagram showing how radio-frequency test operations may be performed for multiple devices under test such as DUT 10' of FIG. 2 without using external test equipment (e.g., without using an external signal generator or signal analyzer that is separate from the device under test). As shown in FIG. 3, test system 110 may include two devices under test 10' having corresponding wireless communications circuitry 34 (e.g., a first device under test 10'-1 and a second device under test 10'-2). Test system 110 may be located in a manufacturing system (e.g., a device assembly system) associated with the manufacture of device 10 and/or wireless communications circuitry 34, may be located in a test facility for testing wireless communications circuitry 34 that is at a remote location relative to where the circuitry is manufactured, or may be at any other desired location.

Test system 110 may include signal attenuation circuitry such as attenuator circuitry 112. A first radio-frequency cable 114 may be coupled between a transmit port 94-1 on first DUT 10'-1 and an input of attenuator circuitry 112. Transmit port 94-1 may be any desired radio-frequency connector port (as shown in FIG. 2) over which one or more transmitters 96 on first DUT 10'-1 transmit radio-frequency signals. A second radio-frequency cable 116 may be coupled between a receive port 94-2 on second DUT 10'-2 and an output of attenuator circuitry 112. Receive port 94-2 may be any desired radio-frequency connector port over which one or more receivers 98 on second DUT 10'-2 receives radio-frequency signals. Radio-frequency cables 114 and/or 116 may include, for example, a miniature coaxial cable with a diameter of less than 2 mm (e.g., 0.81 mm, 1.13 mm, 1.32 mm, 1.37 mm, etc.), a standard coaxial cable with a diameter of about 2-5 mm, and/or other types of radio-frequency cabling or radio-frequency transmission line structures.

During test operations, first DUT 10'-1 may transmit radio-frequency test signals over transmit port 94-1 at selected output power levels (e.g., transmitter circuits 96 and power amplifier circuitry 102 on first DUT 10'-1 may transmit the radio-frequency test signals at desired output power levels). The transmitted radio-frequency test signals may be conveyed to the input of attenuator circuitry 112 via first test cable 114. Attenuator circuitry 112 may attenuate the radio-frequency test signals received from first DUT 10'-1 by one or more desired attenuation levels (e.g., attenuator circuitry 112 may reduce the power level of the received signals by selected amounts). Attenuator circuitry 112 may convey the attenuated test signals to second DUT 10'-2 via second cable 116. Second DUT 10'-2 may receive the attenuated test signals via receive port 94-2 and may perform radio-frequency test operations using the received attenuated signals. For example, second DUT 10'-2 may use the received signals to test and calibrate the radio-frequency performance of LNA circuitry 100 and/or receiver circuits 98 using the received attenuated test signals (e.g., because the attenuated test signals have known predetermined power levels as determined by first DUT 10'-1 and attenuator 112).

Attenuator circuitry 112 may include fixed attenuator circuitry (e.g., attenuator circuitry that attenuates signals received over first cable 114 by a fixed predetermined level such as 20 dB) or programmable/adjustable attenuator circuitry (e.g., attenuator circuitry that actively adjusts the attenuation provided to the received signals). For example, attenuator circuitry 112 may be pre-programmed (e.g., by a test system operator, by a test host, by test software, etc.) to provide a sequence of different attenuation levels to the signals received from first DUT 10'-1 so that a sequence of test signals is provided to second DUT 10'-2 at multiple predetermined power levels. If desired, the test signals generated by first DUT 10'-1 may be provided at a sequence of different output power levels and/or attenuator 112 may provide a sequence of different attenuations to the test signals so that the test signals received at port 94-2 of second DUT 10'-2 have predetermined power levels. As one example, attenuator 12 and/or DUT 10'-1 may provide test signals to second DUT 10'-2 at a sequence of power levels such as −20 dB, −60 dB, −80 dB, and −100 dB. Second DUT 10'-2 may use the received test signals having selected power levels to test and/or calibrate the radio-frequency performance of LNA circuitry 100 and/or receiver circuitry 98. For example, second DUT 10'-2 may generate radio-frequency receiver performance metric data using the received test signals and may process the performance metric data to verify satisfactory radio-frequency operation of the corresponding wireless communications circuitry 34.

If desired, attenuator circuitry 112 may include frequency shifting circuitry that adjusts the frequency of test signals received from first DUT 10'-1 prior to providing the test signals to second DUT 10'-2. If desired, test system 110 may include optional test computing equipment such as test host 118. Test host 118 may include computing equipment such as a personal computer, laptop computer, handheld or portable computer, or any other desired computing equipment. Test host 118 may provide test commands (e.g., commands for performing desired testing operations) and/or test software (e.g., test software such as test software 108 of FIG. 2) to devices under test 10'-1 and 10'-2 and/or attenuator circuitry 112 over corresponding control paths 120. If desired, test host 118 may retrieve test data (e.g., performance metric data, test signals, information identifying whether DUTs 10' pass or fail testing, etc.) from DUTs 10' via paths 120.

By using first DUT 10'-1 to generate test signals that are provided to second DUT 10'-2, test system 110 may test and/or calibrate the receive performance of second DUT 10'-2 without using additional external test equipment such as a radio-frequency signal generator. If desired, after the receive performance of second DUT 10'-2 is characterized, a transmit port 94 on second DUT 10'-2 may be coupled to the input of attenuator 112 via cable 116 and a receive port 94 on first DUT 10'-1 may be coupled to the output of attenuator 112 via cable 114 for performing radio-frequency testing on receiver 98 and/or LNA circuitry 100 in first DUT 10'-1 (e.g., second DUT 10'-2 may generate test signals that are attenuated by attenuator 112 and received at the receive port of first DUT 10'-1). In this way, multiple DUTs 10' may generate test signals for each other to characterize and/or calibrate the receive performance of the DUTs, and expensive and time-consuming external test equipment may be omitted.

Figure 4:
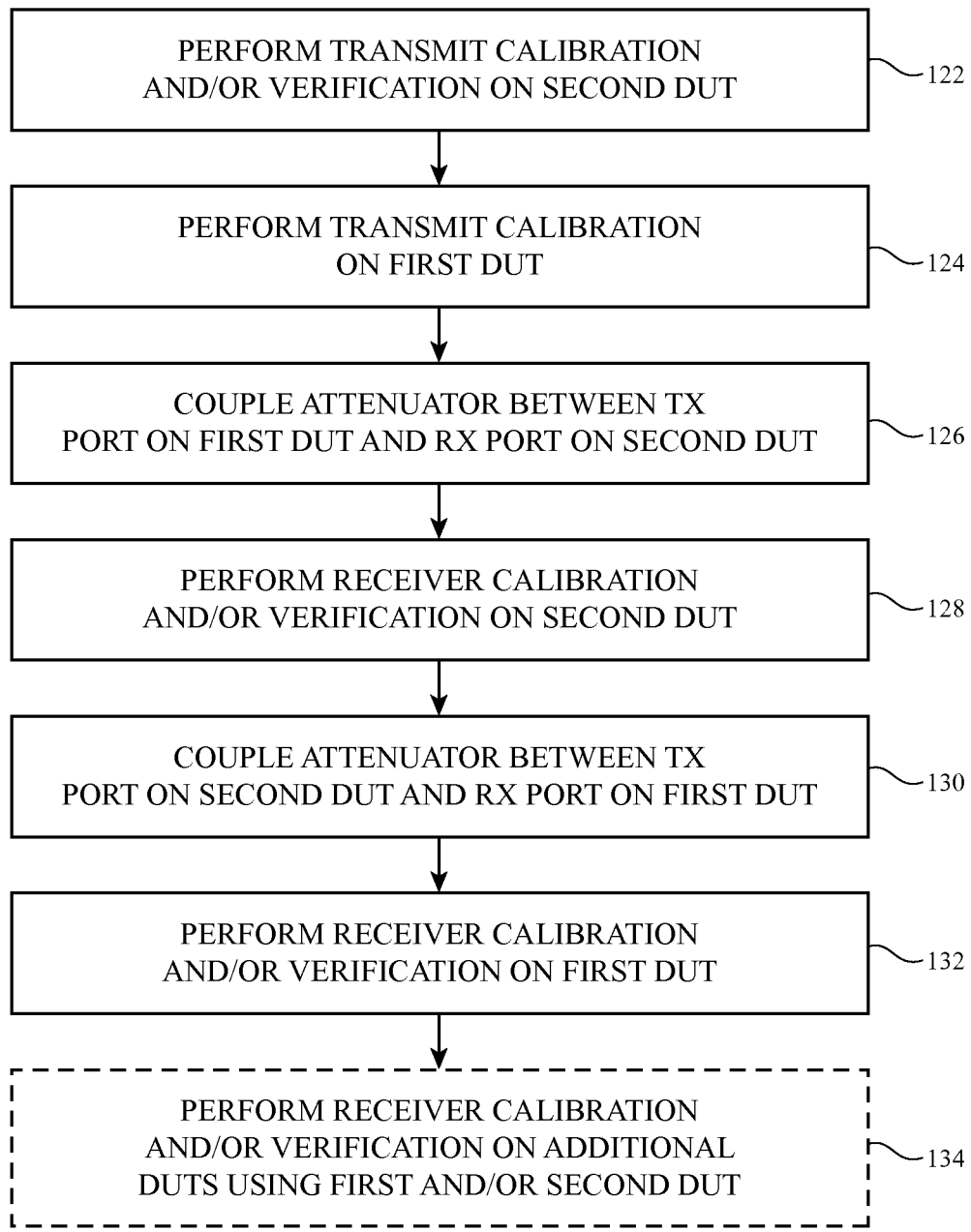
FIG. 4 is a flow chart of illustrative steps that may be performed by a radio-frequency test system of the type shown in FIG. 3 for using multiple devices under test to provide radio-frequency test signals to each other to test and/or calibrate the receive performance of the devices under test without using external signal generator equipment in accordance with an embodiment of the present invention.

FIG. 4 is a flow chart of illustrative steps that may be performed by test system 110 for performing radio-frequency test operations on receiver circuitry (e.g., receiver circuitry 98 and/or LNA circuitry 100) in DUTs 10'.

At step 122, test system 110 may perform transmit calibration and/or verification operations on second DUT 10'-2. For example, external test equipment such as signal analyzer equipment (e.g., vector network analyzer equipment) may be used to calibrate and/or verify satisfactory signal transmission by DUT 10'-2. In this scenario, second DUT 10'-2 may transmit radio-frequency signals to the signal analyzer equipment at one or more desired power levels and the signal analyzer may compare the actual measured power level of the received radio-frequency signals transmitted by DUT 10'-2 to the desired power levels to determine whether DUT 10'-2 is transmitting signals at the desired power levels. If the transmitted signals differ significantly from the desired power levels, test host 118 may load transmit calibration data (e.g., one or more power level offset values) onto second DUT 10'-2. DUT 10'-2 may use the power level offset values when transmitting subsequent radio-frequency signals so that the transmitted radio-frequency signals have the desired power levels. When the signal analyzer equipment determines that the signals transmitted by second DUT 10'-2 have power levels that match the desired power levels, the signal analyzer may determine that the transmit power level performance of second DUT 10'-2 is satisfactory (e.g., may verify satisfactory transmit performance of DUT 10'-2). By verifying the transmit power levels provided by second DUT 10'-2, test system 110 may ensure that DUT 10'-2 provides test, signals with accurate power levels to first DUT 10'-1 during testing of the receive performance of first DUT 10'-1.

At step 124, test system 110 may perform transmit calibration and/or verification operations on first DUT 10'-1. External signal analyzer equipment may be used to calibrate and verify signal transmission by first DUT 10'-1. First DUT 10'-1 may transmit radio-frequency signals to the signal analyzer equipment at one or more desired power levels and the signal analyzer may compare the actual power level of the received radio-frequency signals transmitted by first DUT 10'-1 to the desired power levels to determine whether DUT 10'-1 is transmitting signals at the desired power levels. If the transmitted signals differ significantly from the desired power levels, test host 118 may load transmit calibration data (e.g., one or more power level offset values) onto first DUT 10'-1. DUT 10'-1 may use the power level offset values when transmitting subsequent radio-frequency signals so that the transmitted radio-frequency signals have the desired power levels. When the signal analyzer equipment determines that the signals transmitted by first DUT 10'-1 have power levels that match the desired power levels, the signal analyzer may determine that the transmit power level performance of first DUT 10'-1 is satisfactory (e.g., may verify satisfactory transmit performance of DUT 10'-1). By verifying the transmit power levels provided by first DUT 10'-1, test system 110 may ensure that DUT 10'-1 provides test signals with accurate power levels to second DUT 10'-2 during testing of the receive performance of second DUT 10'-2. This example is merely illustrative. If desired, step 124 may be performed prior to step 122 or concurrently with (e.g., in parallel or simultaneously with) step 122. If desired, steps 122 and 124 may be omitted (e.g., in scenarios where it is known or otherwise predetermined that the transmit power levels of signals generated by DUTs 10' are accurate).

At step 126, test system 110 may couple attenuator 112 between first DUT 10'-1 and second DUT 10'-2. For example, an operator of test system 110 may couple cable 114 between port 94-1 on DUT 10'-1 and the input of attenuator 112 and may couple cable 116 between port 94-2 on DUT 10'-2 and the output of attenuator 112 or test system 110 may autonomously couple attenuator 112 to DUTs 10'-1 and 10'-2.

At step 128, test system 110 may perform receiver calibration and/or verification operations on second DUT 10'-2. Test host 118 and/or test software 108 running on DUT 10'-1 may direct DUT 10'-1 to generate and transmit a sequence of test signals at one or more desired power levels (e.g., using a list mode sequence of test commands loaded onto DUT 10'). DUT 10'-1 may transmit the test signals to attenuator 112 via transmit port 94-1. Attenuator 112 may attenuate the test signals with one or more predetermined attenuation levels so that the attenuated test signals have one or more selected power levels. Attenuator 112 may pass the attenuated signals to receive port 94-2 on DUT 10'-2. DUT 10'-2 may use the received attenuated test signals to calibrate and/or verify the radio-frequency receive performance of the wireless communications circuitry on DUT 10'-2. For example, DUT 10'-2 may measure receiver performance metric data associated with the received test signals and may compare the measured performance metric data to one or more predetermined thresholds (e.g., desired threshold performance metric values, etc.). If the measured performance metric data varies excessively with respect to the predetermined thresholds or the desired performance metric values. DUT 10'-2 may be labeled as failing testing or DUT 10'-2 may generate calibration data (e.g., a number of offset values) to compensate for the discrepancy between the measured performance metric data and the desired performance metric values. If the measured performance metric data is sufficiently similar to the desired performance metric values, DUT 10'-2 may be labeled as passing testing for that performance metric (e.g., test system 110 may determine that DUT 10'-2 passes testing). Test results (e.g., information on whether DUT 10'-2 passes or fails radio-frequency testing for one or more performance metrics) and/or performance metric data generated by DUT 10'-2 may be passed to test host 118 for additional processing, if desired, DUTs 10'-2 that fail testing for one or more performance metrics may, for example, be reworked, redesigned, discarded, flagged, loaded with new software, re-tested, or calibrated.

In one example, second DUT 10'-2 may measure the power level of the received attenuated signals and may compare the measured power level to the desired power level (e.g., the selected power level as determined by the output power level generated by DUT 10'-1 and the known attenuation provided by attenuator 112). If the difference between the measured power level and the desired power level is greater than a predetermined threshold, DUT 10'-2 may generate calibration data (e.g., one or more amplifier offset values). DUT 10'-2 may use the generated offset values (e.g., LNA circuitry 100 on DUT 10'-2 may provide a gain to received signals corresponding to the generated offset values) for receiving subsequent radio-frequency signals (e.g., so that the subsequently received signals have the desired power level when received by receivers 98 on DUT 10'-2). If the difference between the measured power level and the desired power level is below the predetermined threshold, DUT 10'-2 may be labeled as having satisfactory receiver performance (e.g., test system 110 may verify that DUT 10'-2 has adequate receive performance).

At step 130, the input of attenuator circuitry 112 may be coupled to a transmit port 94 on second DUT 10'-2 and the output of attenuator circuitry 112 may be coupled to a receive port 94 on first DUT 10'-1 for performing radio-frequency receiver performance testing on first DUT 10'-1.

At step 132, test system 110 may perform receiver calibration and/or verification operations on first DUT 10'-1. Test host 118 and/or test software 108 running on second DUT 10'-2 may direct second DUT 10'-2 to generate and transmit a sequence of test signals at one or more desired output power levels. Second DUT 10'-2 may transmit the test signals to attenuator 112 via a corresponding transmit port 94. Attenuator 112 may attenuate the test signals using one or more predetermined attenuation levels so that the attenuated test signals have one or more selected power levels. Attenuator 112 may pass the attenuated signals to a corresponding receive port 94 on first DUT 10'-1. DUT 10'-1 may use the received attenuated test signals to calibrate and/or verify the radio-frequency receive performance of the wireless communications circuitry on DUT 10'-1. Test results (e.g., information on whether DUT 10'-1 passes or fails radio-frequency testing for one or more performance metrics) and/or performance metric data generated by DUT 10'-1 may be passed to test host 118 for additional processing, if desired.

At optional step 134, verified and/or calibrated DUT 10'-1 and/or DUT 10'-2 (e.g., DUTs for which satisfactory receive performance has been verified) may be used to perform receiver calibration and/or verification operations on additional devices under test. For example, the transmit port of one of DUTs 10'-1 and 10'-2 may be coupled to a receive port on an additional device under test via attenuator 112 for testing the receiver performance of the additional device under test. The example of FIG. 3 is merely illustrative. If desired, test system 110 may include any desired number of DUTs 10' that are coupled together via attenuator circuitry for testing the receiver performance of the corresponding wireless communications circuitry. As one example, a first DUT 10' may provide test signals to the receive port of a second DUT 10' to test the receiver performance of the second DUT 10', the second DUT 10' may provide test signals to the receive port of a third DUT 10' to test the receiver performance of the third DUT 10', and the third DUT 10' may provide test signals to the receive port of the first DUT 10' to test the receiver performance of the first DUT 10'. Any desired number of DUTs 10' may be tested in a closed chain in this manner without the need for external signal generating or signal analyzing equipment.

Figure 5:
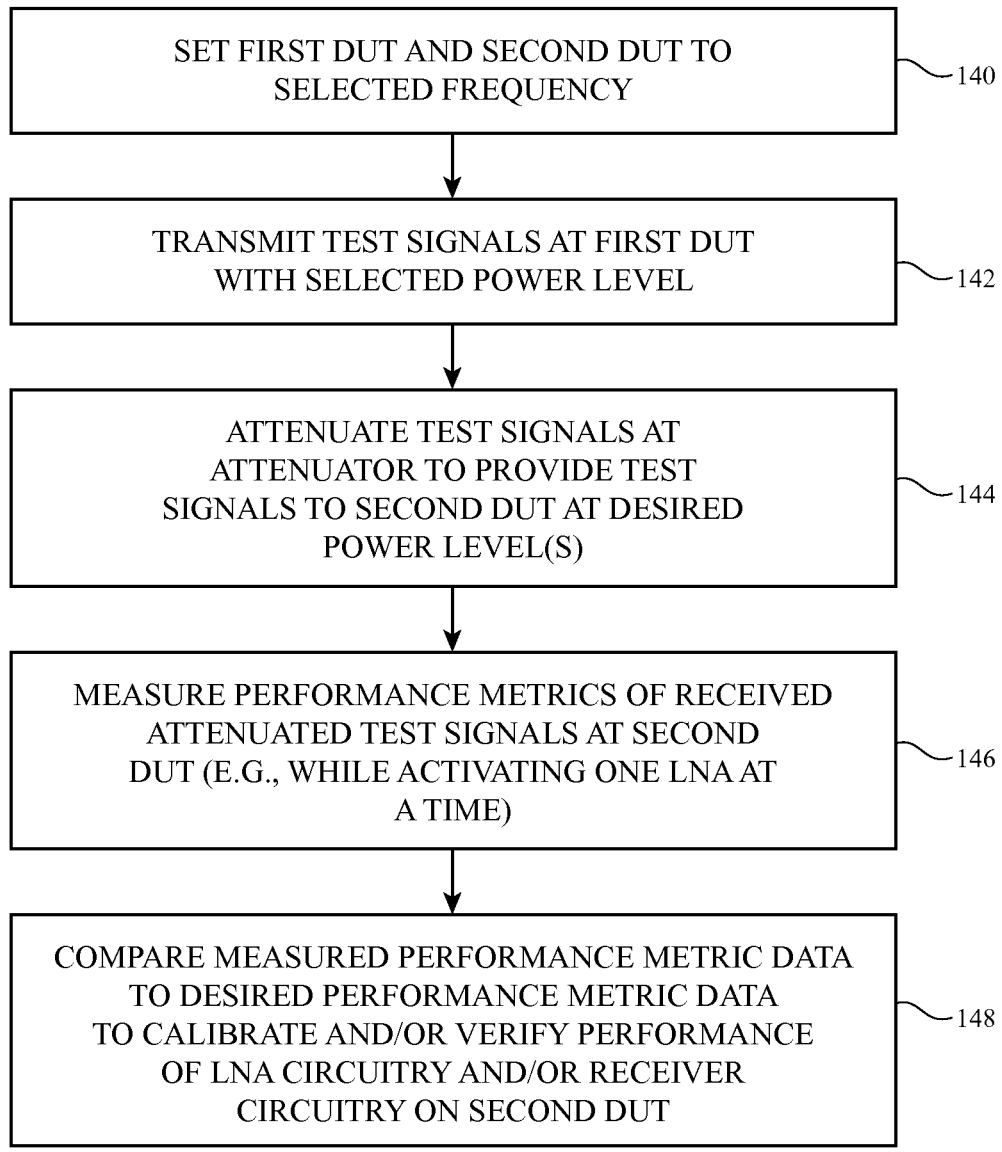
FIG. 5 is a flow chart of illustrative steps that may be performed by a radio-frequency test system of the type shown in FIG. 3 for using a first device under test to provide radio-frequency test signals to a second device under test to characterize and/or calibrate the receive performance of the second electronic device under test without using external signal generator equipment in accordance with an embodiment of the present invention.

FIG. 5 is a flow chart of illustrative steps that may be performed by test system 110 to perform receiver calibration and verification operations on second device under test 10'-2 using test signals generated by a first device under test 10'-1 without using external test signal analyzer or generator equipment. The steps of FIG. 5 may, for example, be performed while processing step 128 of FIG. 4.

At step 140, test host 118 and/or test software 108 running on DUT 10'-1 may set transmitter circuitry 96 and/or tuning circuitry on DUT 10'-1 to transmit signals using a selected frequency. For example, DUT 10'-1 may select a frequency for transmission at which DUT 10'-2 receives signals (e.g., may select a cellular, Wi-Fi, or Bluetooth transmit frequency that overlaps with a cellular, Wi-Fi, or Bluetooth receive frequency). In general, test signals received at receive port 94-2 on DUT 10'-2 need to be at a frequency that is handled by the receiver circuitry on DUT 10'-2 in order for DUT 10'-2 to properly receive the test signals.

At step 142, first DUT 10'-1 may transmit test signals at the selected frequency and at a selected output power level over transmit port 94-1. Cable 114 may convey the transmitted test signal to the input of attenuator circuitry 112.

At step 144, attenuator circuitry 112 may attenuate the test signals using one or more selected attenuation levels and may provide the attenuated signals to receive port 94-2 on second DUT 10'-2. Attenuator circuitry 112 may provide the attenuated test signals to second DUT 10'-2 at one or more desired power levels (e.g., by adjusting the attenuation provided by circuitry 112). For example, attenuator circuitry 112 may provide an attenuation of 20 dB, 30 dB, and 40 dB to the test signals, may provide an attenuation so that the test signals have consecutive power levels of −20, −60, −80, and −100 dB, etc. In general, attenuator circuitry 112 may provide any desired number of attenuation levels having any desired magnitude to the test signals.

At step 146, second DUT 10'-2 may measure performance metric data using the received attenuated test signals. If desired, DUT 10'-2 may gather receiver performance metric data such as system noise values, RSSI values, or power level values of the received attenuated test signals using only a single gain stage (amplifier) in LNA circuitry 100 (e.g., by enabling only a selected one of the amplifiers in LNA circuitry 100), using every gain stage in LNA circuitry 100 (e.g., by enabling all of the amplifiers in LNA circuitry 100), and/or using any desired combination of the gain stages in LNA circuitry 100 (e.g., in order to fully characterize the performance of LNA circuitry 100). If desired, DUT 10'-2 may sequentially measure performance metric data with one LNA in LNA circuitry 100 activated at a time to individually characterize the performance of each LNA in LNA circuitry 100.

At step 148, second DUT 10'-2 may compare the measured performance metric data to desired performance metric data to characterize the receive performance of wireless communications circuitry 34. If desired, DUT 10'-2 may generate calibration data to mitigate differences between the measured performance metric data and the desired performance metric data. For example, DUT 10'-2 may determine desired gains to use for one or more of the amplifiers in LNA circuitry 100 for receiving subsequent signals (e.g., may determine which amplifiers in LNA circuitry 100 to activate using power control circuitry 104 and what gain to provide using LNA circuitry 100) such that any subsequently measured performance metric data matches the desired performance metric data. If the measured performance metric data suitably matches the desired performance metric data, satisfactory receive performance of DUT 10'-2 may be considered to be verified (e.g., system 110 may determine that DUT 10'-2 passes testing). By ensuring that test signals are received at DUT 10'-2 at predetermined power levels (e.g., using attenuator 112 and/or DUT 10'-1), DUT 10'-2 may accurately characterize the receive performance of wireless communications circuitry 34.

The example of FIG. 5 is merely illustrative. If desired, step 140 may be omitted and attenuator 112 may be used to shift the frequency of the test signals generated by first DUT 10'-1 to a receive frequency used by second DUT 10'-2 (e.g., while processing step 144). In this scenario, attenuator circuitry 112 may shift the frequency of the test signals in addition to attenuating the test signals. If desired, the sequence of test signal power levels provided by attenuator circuitry 112 to second DUT 10'-2 may be determined based on attenuation provided by attenuator 112, power levels generated by first DUT 10'-1, or a combination of power level generated by first DUT 10'-1 and attenuation provided by attenuator 112. If desired, attenuation settings (e.g., pre-programmed attenuation levels) may be stored on attenuator circuitry 112 for subsequent testing operations.

If desired, antenna diversity schemes may be implemented on wireless communications circuitry 34 in which multiple redundant antennas are used in handling communications for a particular band or bands of interest. In an antenna diversity scheme, storage and processing circuitry 28 may select which antenna 40 to use in real time based on signal strength measurements or other data. In multiple-input-multiple-output (MIMO) schemes, multiple antennas may be used in transmitting and receiving multiple data streams, thereby enhancing data throughput. In devices under test having multiple redundant antennas (e.g., DUTs that implement a MIMO scheme), a single device under test may perform test operations on itself without using external test equipment or additional devices under test to generate test signals.

Figure 6:
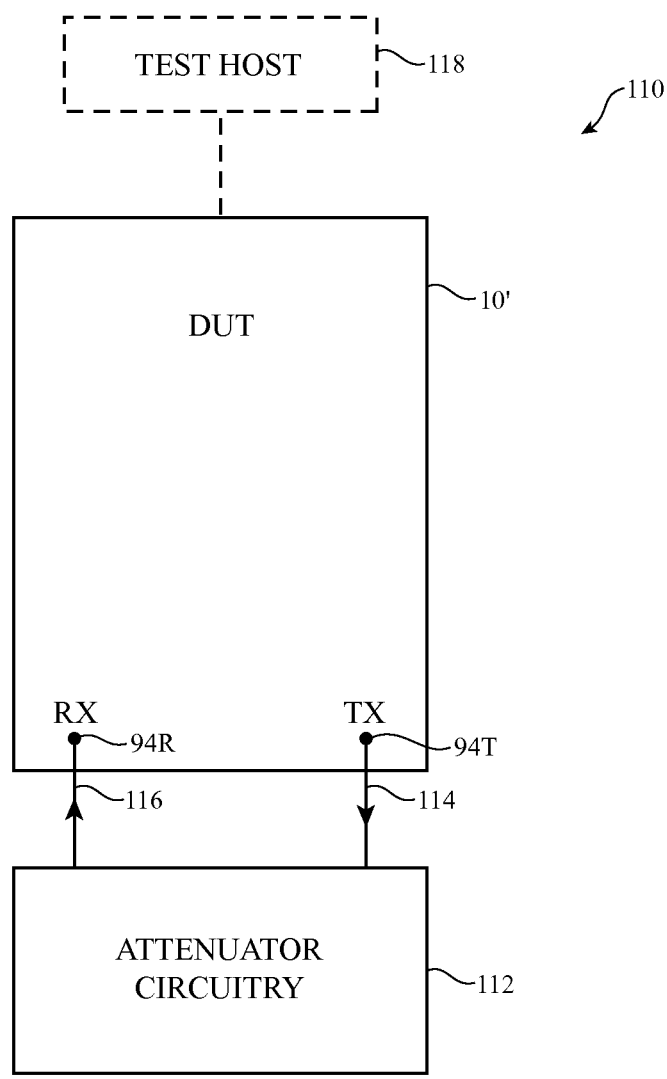
FIG. 6 is a diagram of an illustrative test system for testing wireless communications circuitry on a device under test in which the device under test provides radio-frequency test signals to itself to test the receive performance of the device under test without using external signal generator equipment in accordance with an embodiment of the present invention.

As shown in FIG. 6, test system 110 may include a single device under test 10' having corresponding wireless communications circuitry 34 and multiple antennas (e.g., for implementing a MIMO scheme). Device under test 10' may have two antenna ports 94 (e.g., a first antenna port 94R coupled to a corresponding receiver circuit 98 in transceiver circuitry 90 and a second antenna port 94T coupled to a corresponding transmitter circuit 96 in transceiver circuitry 90). Ports 94R and 94T may, for example, couple transceiver circuitry 90 to respective first and second antennas in DUT 10' when not coupled to radio-frequency cabling.

Transmit port 94T may be coupled to the input of attenuator circuitry 112 via radio-frequency cable 114 whereas receive port 94R may be coupled to the output of attenuator circuitry 112 via radio-frequency cable 116. During test operations, DUT 10' may transmit radio-frequency test signals at one or more desired output power levels via transmit port 94T. The transmitted radio-frequency test signals may be conveyed to the input of attenuator circuitry 112 via first test cable 114. Attenuator circuitry 112 may attenuate the radio-frequency test signals received from transmit port 94T by one or more desired attenuation levels. Attenuator circuitry 112 may convey the attenuated test signals to receive port 94R via second cable 116. DUT 10' may receive the attenuated test signals via receive port 94R and may perform radio-frequency test operations using the received attenuated signals. For example, DUT 10' may use the received signals to test and calibrate the radio-frequency performance of LNA circuitry 100 and/or receiver circuits 98 using the received attenuated test signals (e.g., because the attenuated test signals have a known predetermined power level as determined by the transmitter circuitry and power amplifier circuitry of DUT 10' and attenuator 112).

Figure 7:
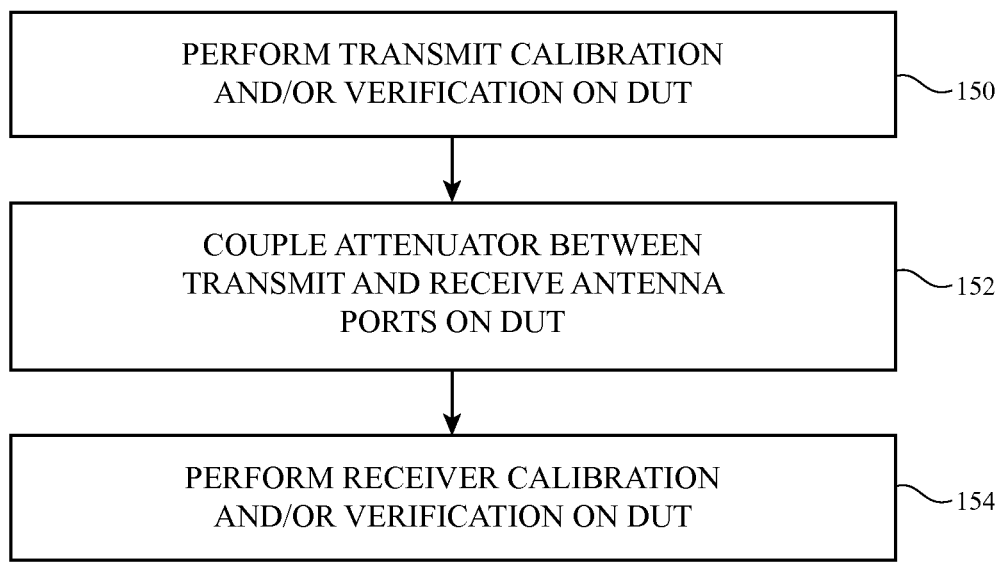
FIG. 7 is a flow chart of illustrative steps that may be performed by a radio-frequency test system of the type shown in FIG. 6 for using a single electronic device under test to provide radio-frequency test signals to itself to characterize and/or calibrate the receive performance of the device under test without using external signal generator equipment in accordance with an embodiment of the present invention.

FIG. 7 is a flow chart of illustrative steps that may be performed by test system 110 for performing radio-frequency test operations on receiver circuitry in a device under test 10' using test signals generated by that device under test (e.g., a device under test that implements a MIMO scheme such as DUT 10' as shown in FIG. 6).

At step 150, test system 110 may perform transmit calibration and/or verification operations on DUT 10'. For example, external test equipment such as vector network analyzer equipment may be used to calibrate and verify signal transmission (e.g., transmit power levels) of DUT 10'. By verifying the transmit power levels of DUT 10', test system 110 may ensure that DUT 10' provides test signals with accurate power levels to receive port 94R (e.g., for testing the receive performance of DUT 10'). If desired, step 150 may be omitted if the transmit performance (e.g., output power levels) of DUT 10' is known to be accurate.

At step 152, test system 110 may couple attenuator 112 between transmit port 94T on DUT 10' and receive port 94R on DUT 10'. For example, an operator of test system 110 may couple cable 114 between port 94T on DUT 10' and the input of attenuator 112 and may couple cable 116 between port 94R on DUT 10' and the output of attenuator 112 or test system 110 may autonomously couple attenuator 112 to DUT 10'.

At step 154, test system 110 may perform receiver calibration and/or verification operations on DUT 10'. For example, test host 118 and/or test software 108 running on DUT 10' may direct DUT 10' to generate and transmit a sequence of test signals at one or more desired power levels at port 94T. DUT 10' may transmit the test signals to attenuator 112 via transmit port 94T and cable 114. Attenuator 112 may attenuate the test signals with one or more predetermined attenuation levels so that the attenuated test signals have one or more predetermined power levels. Attenuator 112 may pass the attenuated signals to receive port 94R. DUT 10' may use the received attenuated test signals to calibrate and/or verify the radio-frequency receive performance of the wireless communications circuitry on DUT 10'-2. The steps of FIG. 7 may be repeated on multiple devices under test (e.g., in sequence or in parallel) to test and/or calibrate a group of devices under test. In this way, the receiver performance of DUT 10' may be verified and calibrated without using external test signal generators and/or external signal analyzers.

If desired, DUT 10' may characterize the transmit performance of wireless communications circuitry 34 without using external signal analyzer or signal generator equipment. For example, DUT 10' may include a feedback path coupled between one or more transmitter circuits and one or more receiver circuits for receiving signals that are transmitted by the transmitter circuits.

Figure 8:
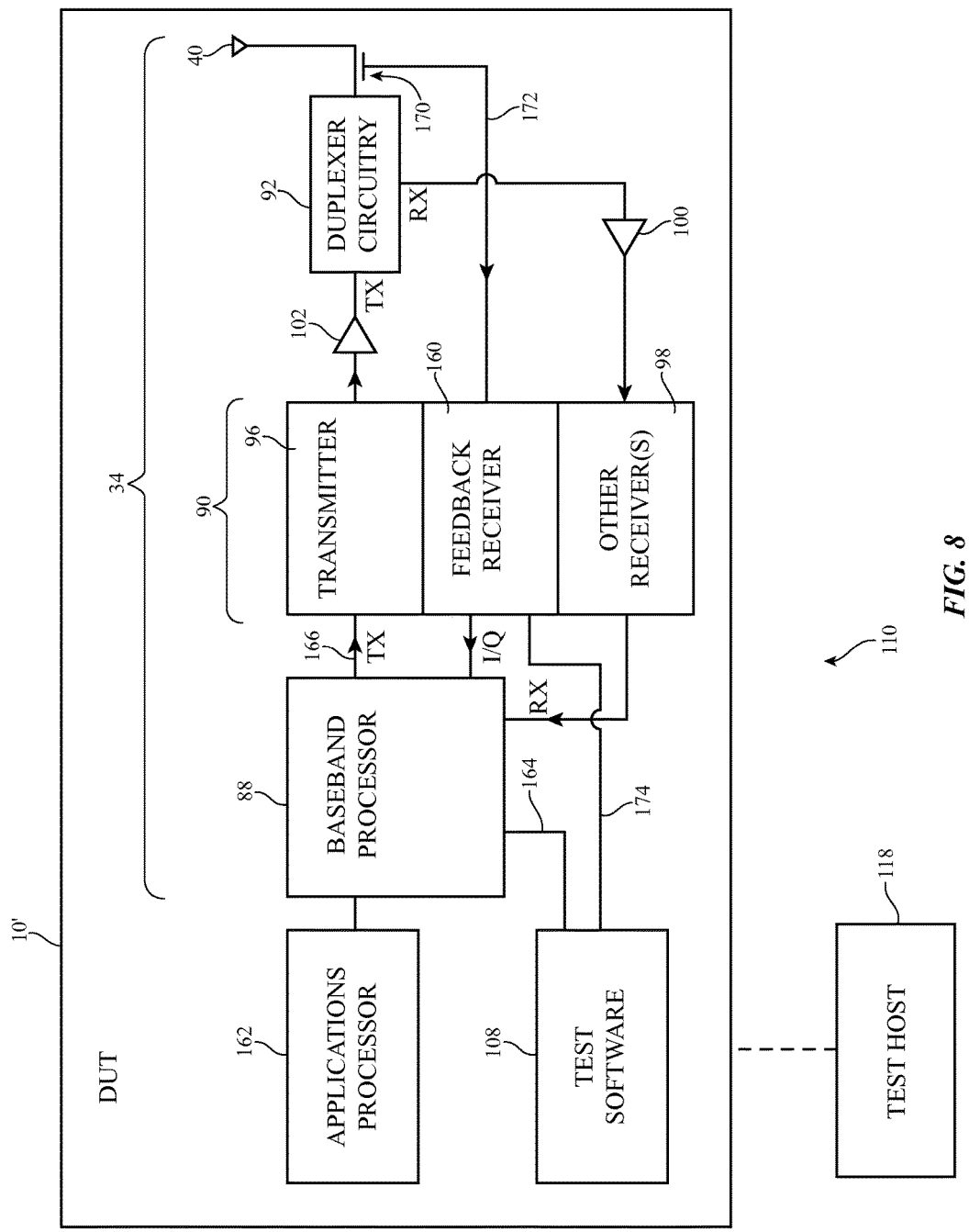
FIG. 8 is a diagram of an illustrative electronic device under test having feedback receiver circuitry and processing circuitry for characterizing and/or calibrating the transmit performance of the electronic device under test without using external radio-frequency tester equipment in accordance with an embodiment of the present invention.

FIG. 8 is an illustrative circuit diagram showing how DUT 10' may include a feedback path for performing testing of the radio-frequency transmit performance of wireless communications circuitry 34. As shown in FIG. 8, DUT 10' may include an applications processor 162 that runs applications and other software (e.g., operating system software). Digital data signals that are to be transmitted by DUT 10' may be provided to baseband processor 88 by applications processor 162. If desired, test software 108 may provide test commands to baseband processor 88 over path 164 that instruct baseband processor to generate desired test signals. Baseband processor 88 may modulate the test signals and may provide the test signals to transmitter circuit 96 in transceiver circuitry 96 over path 166. Transmitter circuitry 96 may up-convert the test signals to a radio-frequency and may pass the radio-frequency test signals to antenna 40 via duplexer circuitry 92 and power amplifier circuitry 102. Power amplifier circuitry 102 may amplify the test signals and may provide the transmitted signals with a desired gain. Filtering circuitry such as duplexer circuitry 92 may isolate uplink signals provided to antenna 40 from downlink signals received by antenna 40 (e.g., so that the downlink signals are conveyed to receiver circuitry 98 via LNA circuitry 100).

As shown in FIG. 8, radio-frequency coupling circuitry such as radio-frequency coupler 170 may be coupled between antenna 40 and filtering circuitry 92. Radio-frequency coupler 170 may pass the radio-frequency test signals transmitted from transmitter 96 to feedback receiver 160 in transceiver circuitry 90 via feedback path 172. Feedback receiver 160 may be a dedicated receiver circuit in transceiver circuitry 90 that only receives signals that are transmitted by transmitter 96 over feedback path 172. Feedback receiver circuit 160 may down-convert the test signals received over feedback path 172 from transmitter 96 into corresponding in-phase and quadrature phase data (I/Q data or I/Q test data). Feedback receiver 160 may pass the I/Q data associated with the test signals to baseband processor 88.

Test software 108 may provide control signals to baseband processor 88 via path 164 that direct baseband processor 88 to measure transmit performance metric data associated with the test signals (e.g., the I/Q test data) received from feedback receiver 160. For example, test software 108 may direct baseband processor 88 to measure error vector magnitude (EVM) data, ACLR data, spectrum data, output power level data, or any other desired transmit performance metric data associated with the transmission of the corresponding test signals using transmitter 96 and/or amplifier 102. Test software 108 may retrieve the performance metric data from baseband processor 88 over path 164 and may process the performance metric data to characterize the radio-frequency transmit performance of wireless communications circuitry 34. If desired, test software 108 may provide control signals to feedback receiver 174 to control the operation of feedback receiver 174.

If desired, optional test host 118 may be coupled to DUT 10' for loading test software 108 onto DUT 10', for providing test commands to DUT 10', for receiving performance metric data from DUT 10', and/or for receiving information on whether DUT 10' has satisfactory radio-frequency transmit performance from DUT 10'. In one suitable arrangement, DUT 10' may perform radio-frequency testing on itself using test software 108 (e.g., without using a test host) during normal operation of DUT 10' (e.g., while DUT 10' is in use by an end user and is no longer being tested or manufactured). In another suitable arrangement, DUT 10' may perform radio-frequency testing using test commands received from test host 118 (e.g., without loading test software 108).

Transceiver circuitry 90 may, if desired, be formed on a single integrated circuit or on multiple integrated circuits. For example, transmitter 96, feedback receiver 160, and receivers 98 may be formed on a single shared integrated circuit (chip). In another suitable arrangement, transmitter 96 and feedback receiver 160 are formed on a single shared integrated circuit whereas receivers 98 are formed on one or more separate integrated circuits. In yet another suitable arrangement, feedback receiver 160 and receivers 98 are formed on a single common integrated circuit whereas transmitter 96 is formed on a separate integrated circuit. In another suitable arrangement, transmitters 96 and receivers 98 are formed on a first Integrated circuit whereas feedback receiver 160 is formed on a second integrated circuit. In yet another suitable arrangement, transmitter 96, feedback receiver 160, and receivers 98 are each formed on different respective integrated circuits. If desired, additional transmitters may be formed on transceiver circuitry 90 (e.g., on a shared integrated circuit with circuitry 96, 100, and 98).

Figure 9:
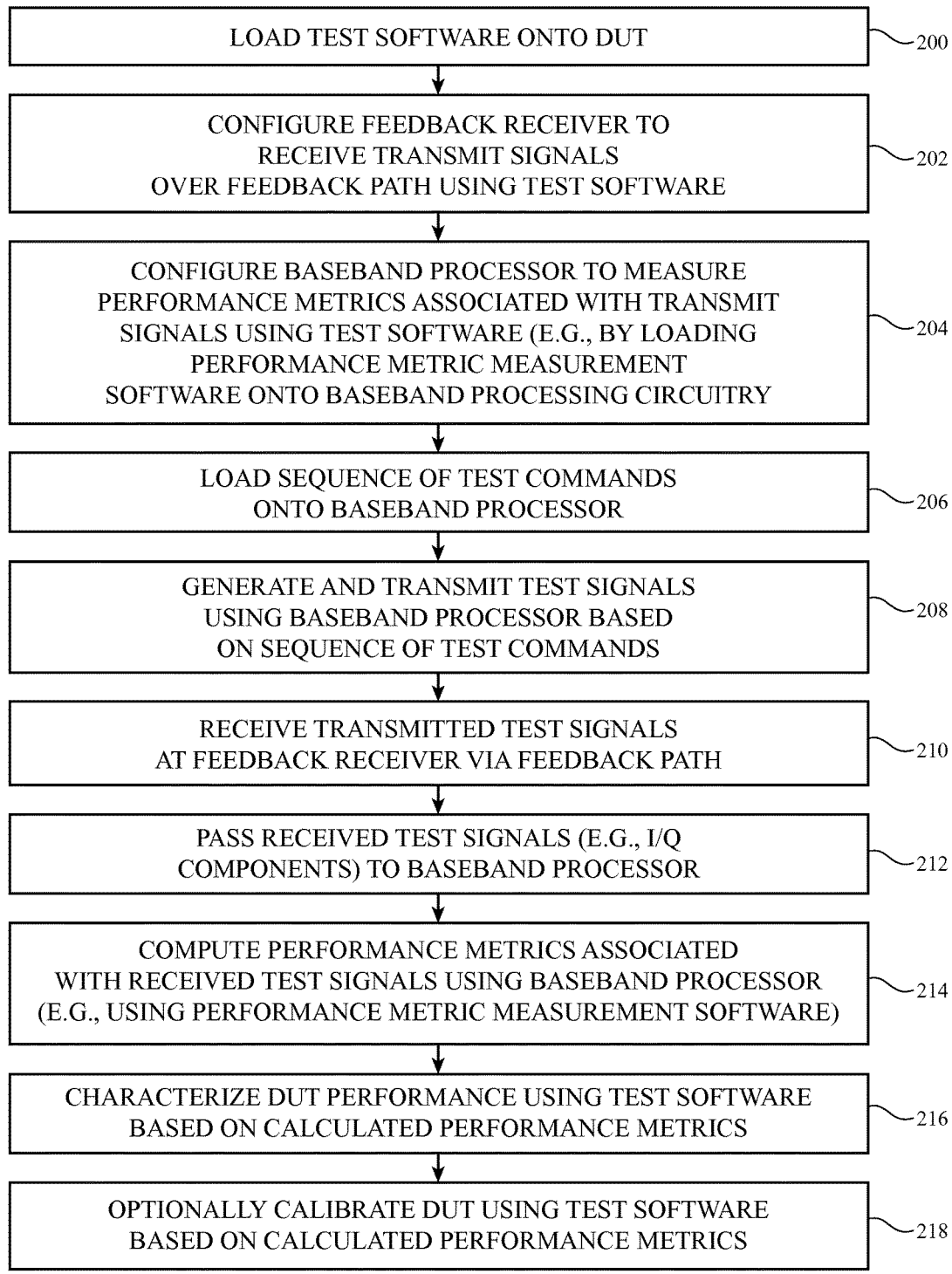
FIG. 9 is a flow chart of illustrative steps that may be performed by a radio-frequency test system for testing wireless communications circuitry on a device under test of the type shown in FIG. 8 for characterizing and/or calibrating the transmit performance of the electronic device under test without using external signal analyzer equipment in accordance with an embodiment of the present invention.

FIG. 9 is a flow chart of illustrative steps that may be performed by test system 110 for testing the radio-frequency transmit performance of DUT 10' having a feedback receiver 160 that receives radio-frequency test signals transmitted by transmitter circuit 96 (shown in FIG. 8).

At step 200, test host 118 or other external computing equipment may load test software 108 onto DUT 10'. For example, test software 108 may be loaded onto storage and processing circuitry 28 of FIG. 1, onto applications processor 162, or onto other circuitry on device 10'. In another suitable arrangement, testing may be performed without loading test software onto DUT 10' (e.g., test host 118 may control testing on DUT 10' be providing test commands directly to DUT 10' without loading test software 108 onto DUT 10').

At step 202, test software 108 may provide control signals to feedback receiver 160 via path 174 to configure feedback receiver 160 to receive transmit signals over feedback path 172 and to convert the transmit signals Into corresponding I/Q data.

At step 204, test software 108 may provide control signals to baseband processor 88 via path 164 to configure baseband processor 88 to measure transmit performance metric data from I/Q data received from feedback receiver 160. For example, test software 108 may instruct baseband processor 88 to measure EVM data, power level data, ACLR data, or any other desired transmit performance metric data using the I/Q test data received from feedback receiver 160. If desired, test software 108 may load performance metric measurement software (e.g., one or more performance metric measurement routines or algorithms) onto baseband processor 88 that is executed when processor 88 receives I/Q data from feedback receiver 160.

At step 206, test software 108 may load a sequence of test commands onto baseband processor 88. The sequence of test commands (e.g., a test command data structure or list such as a list mode sequence of test commands) may direct baseband processor 88 to generate a sequence of desired test signals. The sequence of test commands may be used to control transmitter 96 and power amplifier 102 to provide the test signals with, for example, a desired power level, at a desired frequency, with a desired modulation scheme, etc.

At step 208, baseband processor 88 may generate and transmit test signals using the loaded sequence of test commands (e.g., by executing the sequence of test commands). Baseband processor 88 may pass the test commands to transmitter 96. Transmitter 96 may modulate the test signals and up-convert the test signals to a radio-frequency. Transmitter 96 may transmit the test signals to amplifier 102 and amplifier 102 may amplify the transmitted test signals.

At step 210, feedback receiver 160 may receive the transmitted radio-frequency test signals from the output of power amplifier 102 via coupler 170 and feedback path 172. Feedback receiver 160 may convert the transmitted radio-frequency test signals into corresponding I/Q data. Feedback receiver 160 may convey the transmitted test signals (e.g., the corresponding I/Q data) to baseband processor 88.

At step 212, baseband processor 88 may compute performance metric data associated with the test signals received from feedback receiver 160 (e.g., the corresponding I/Q data received from feedback receiver 160). For example, baseband processor 88 may compute the performance metric data using the performance measurement software loaded onto processor 88 by test software 108 while processing step 204. Baseband processor 88 may compute transmit performance metric data (e.g., EVM data, spectrum flatness data, phase error data, ACLR data, modulation data, spectral data, bit error rate data, minimum and maximum power data, RSSI data, etc.) using the test signals and may convey the transmit performance metric data to test software 108 via path 164.

At step 214, test software 108 may process the received transmit performance metric data to characterize the radio-frequency transmit performance of DUT 10'. For example, test software 108 may compare the transmit performance metric data to one or more performance metric threshold values (or ranges of acceptable performance metric values). If the received performance metric data is within a range of acceptable performance metric values, test software 108 may determine that DUT 10' passes testing for that performance metric. If the received performance metric data is outside of a range of acceptable performance metric values, test software 108 may determine that DUT 10' fails testing for that performance metric, may retest DUT 10' for that performance metric, may flag DUT 10' as needing reworking, redesign, re-testing, or scrapping, etc.

At optional step 218, if the lest software determines that one of the computed performance metric values fails outside of the range of acceptable performance metric values, test software 108 may generate calibration data to correct the radio-frequency performance of circuitry 34 that caused the measured performance metric data to fall outside of the range of acceptable performance metric values (e.g., test software 108 may calibrate the transmit performance of DUT 10'). For example, if software 108 determines that a measured power level is below a target (desired) power level, software 108 may generate an offset gain value for use by amplifier 102 when amplifying subsequent signals (e.g., so that the amplified signals have the desired power level).

By measuring transmit performance metric data using a feedback receiver coupled to the signal transmission path, DUT 10' may characterize the radio-frequency transmit performance and/or calibrate the radio-frequency transmit performance of wireless communications circuitry 34 without using external signal generator or external signal analyzer equipment. By loading test software 108 onto DUT 10' to direct radio-frequency test operations, DUT 10' may perform test and/or calibration operations without interfacing with an external test host (e.g., DUT 10' may perform testing and calibration operations in the field when in use by an end user). If desired, test software 108 may be removed or uninstalled from DUT 10' after performing test and/or calibration operations.

If desired, the receive performance of DUT 10' may be tested/calibrated in addition to testing/calibrating the transmit performance of DUT 10' (e.g., DUT 10' may be tested and calibrated in a test system such as that shown in FIGS. 3 and/or 4 in addition to testing and calibrating DUT 10' in a test system such as that shown in FIG. 8). For example, test system 110 may test and calibrate the transmit performance of a given DUT 10' without using external test equipment (e.g., using the steps of FIG. 9) and may subsequently use that DUT 10' to provide test signals to a second DUT to test the receive performance of the second DUT 10' (e.g., the steps of FIG. 9 may be performed while processing steps 122/124 of FIG. 4 if desired).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using a test system that includes a test host to perform radio-frequency testing on first and second cellular telephones, the method comprising:
    with the test host, sending a test command to the first cellular telephone directing the first cellular telephone to generate radio-frequency test signals;
    with the first cellular telephone, transmitting the radio-frequency test signals via a radio-frequency transmit port on the first cellular telephone;
    with the second cellular telephone, receiving the radio-frequency test signals from the first cellular telephone via a radio-frequency receive port on the second cellular telephone; and
    with the second cellular telephone, generating radio-frequency performance metric data based on the received radio-frequency test signals.

2. The method defined in claim 1, further comprising:
    with the test host, sending an additional test command to the second cellular telephone directing the second cellular telephone to generate additional radio-frequency test signals;
    with the second cellular telephone, transmitting the additional radio-frequency test signals via an additional radio-frequency transmit port on the second cellular telephone; and
    with the first cellular telephone, receiving the additional radio-frequency test signals from the second cellular telephone via an additional radio-frequency receive port on the first cellular telephone.

3. The method defined in claim 2, further comprising:
    with the first cellular telephone, generating additional radio-frequency performance metric data based on the received additional radio-frequency test signals.

4. The method defined in claim 1, further comprising:
    with a third cellular telephone, transmitting additional radio-frequency test signals via an additional radio-frequency transmit port on the cellular telephone;
    with the first cellular telephone, receiving the additional radio-frequency test signals via an additional radio-frequency receive port on the first cellular telephone; and
    with the first cellular telephone, generating radio-frequency performance metric data based on the additional radio-frequency test signals.

5. The method defined in claim 1, wherein the test system comprises attenuator circuitry, wherein an input of the attenuator circuitry is coupled to the radio-frequency transmit port on the first cellular telephone and an output of the attenuator circuitry is coupled to the radio-frequency receive port on the second cellular telephone, the method further comprising:
    with the attenuator circuitry, attenuating the radio-frequency test signals transmitted by the first cellular telephone.

6. The method defined in claim 1, wherein the second cellular telephone comprises low noise amplifier circuitry having a plurality of gain stages coupled between a receiver circuit and the radio-frequency receive port and wherein generating the radio-frequency performance metric data comprises:
    generating the radio-frequency performance metric data while only a selected one of the gain stages in the plurality of gain stages is activated.

7. The method defined in claim 1, further comprising:
    with the second cellular telephone, determining whether the generated radio-frequency performance metric data falls within a range of acceptable radio-frequency performance metric values; and
    generating calibration data for the second cellular telephone that calibrates radio-frequency receiver performance in the second cellular telephone in response to determining that the generated radio-frequency performance metric data does not fall within the range of acceptable radio-frequency performance metric values.

8. A method of using a test system to perform radio-frequency testing on first and second electronic devices under test, the method comprising:
    with the first electronic device under test, transmitting radio-frequency test signals via a radio-frequency transmit port on the first electronic device under test;
    with the second electronic device under test, receiving the radio-frequency test signals from the first electronic device under test via a radio-frequency receive port on the second electronic device under test;
    with the second electronic device under test, generating radio-frequency performance metric data based on the received radio-frequency test signals;
    with the second electronic device under test, transmitting additional radio-frequency test signals via an additional radio-frequency transmit port on the second electronic device under test;
    with the first electronic device under test, receiving the additional radio-frequency test signals from the second electronic device under test via an additional radio-frequency receive port on the first electronic device under test;
    with the first electronic device under test, generating additional radio-frequency performance metric data based on the received additional radio-frequency test signals;
    with the first electronic device under test, labeling the first electronic device under test as one of passing testing and failing testing based on the generated additional radio-frequency performance metric data; and
    with the second electronic device under test, labeling the second electronic device under test as one of passing testing and failing testing based on the generated radio-frequency performance metric data.

9. The method defined in claim 8, further comprising:
passing the label of the first electronic device under test and the generated additional radio-frequency performance metric data to a test host for additional processing; and
passing the label of the second electronic device under test and the generated radio-frequency performance metric data to the test host for additional processing.

10. A method of using a test system to perform radio-frequency testing on first and second electronic devices under test, wherein the first and second electronic devices under test both include cellular telephone transceiver circuitry and the test system includes attenuator circuitry with an input and an output, the method comprising:
with the first electronic device under test, transmitting radio-frequency test signals via a radio-frequency transmit port on the first electronic device under test while the input of the attenuator circuitry is coupled to the radio-frequency transmit port on the first electronic device under test;
with the attenuator circuitry, attenuating the radio-frequency test signals transmitted by the first electronic device under test;
with the second electronic device under test, receiving the radio-frequency test signals from the attenuator circuitry via a radio-frequency receive port on the second electronic device under test while the output of the attenuator circuitry is coupled to the radio-frequency receive port on the second electronic device under test; and
with the second electronic device under test, generating radio-frequency performance metric data based on the received radio-frequency test signals.

11. The method defined in claim 10, further comprising:
after generating the radio-frequency performance metric data based on the received radio-frequency test signals, coupling the input of the attenuator circuitry to a radio-frequency transmit port on the second electronic device under test and the output of the attenuator circuitry to a radio-frequency receive port on the first electronic device under test.

12. The method defined in claim 11, further comprising:
with the second electronic device under test, transmitting additional radio-frequency test signals via the radio-frequency transmit port on the second electronic device under test; and
with the first electronic device under test, receiving the radio-frequency test signals from the attenuator circuitry via the radio-frequency receive port on the first electronic device under test.

13. The method defined in claim 12, further comprising:
with the first electronic device under test, generating additional radio-frequency performance metric data based on the received additional radio-frequency test signals.

14. The method defined in claim 13, further comprising:
with the first electronic device under test, determining whether the first electronic device under test has satisfactory radio-frequency receiver performance based on the generated additional radio-frequency performance metric data; and
with the second electronic device under test, determining whether the second electronic device under test has satisfactory radio-frequency receiver performance based on the generated radio-frequency performance metric data.

15. The method defined in claim 10, wherein the first electronic devices under test includes a first touch screen, a first accelerometer, a first speaker, and a first microphone and the second electronic device under test includes a second touch screen, a second accelerometer, a second speaker, and a second microphone.

16. The method defined in claim 15, wherein the first electronic devices under test includes a first camera, a first proximity sensor, and a first button and the second electronic device under test includes a second camera, a second proximity sensor, and a second button.

17. The method defined in claim 10, wherein the input of the attenuator circuitry is coupled to the radio-frequency transmit port on the first electronic device under test by a first radio-frequency cable and the output of the attenuator circuitry is coupled to the radio-frequency receive port on the second electronic device under test by a second radio-frequency cable.

\* \* \* \* \*